Sept. 14, 1943.  E. L. CODDINGTON  2,329,185
MACHINE FOR CUTTING GRASS, WEEDS, AND THE LIKE
Filed July 30, 1940  6 Sheets-Sheet 1
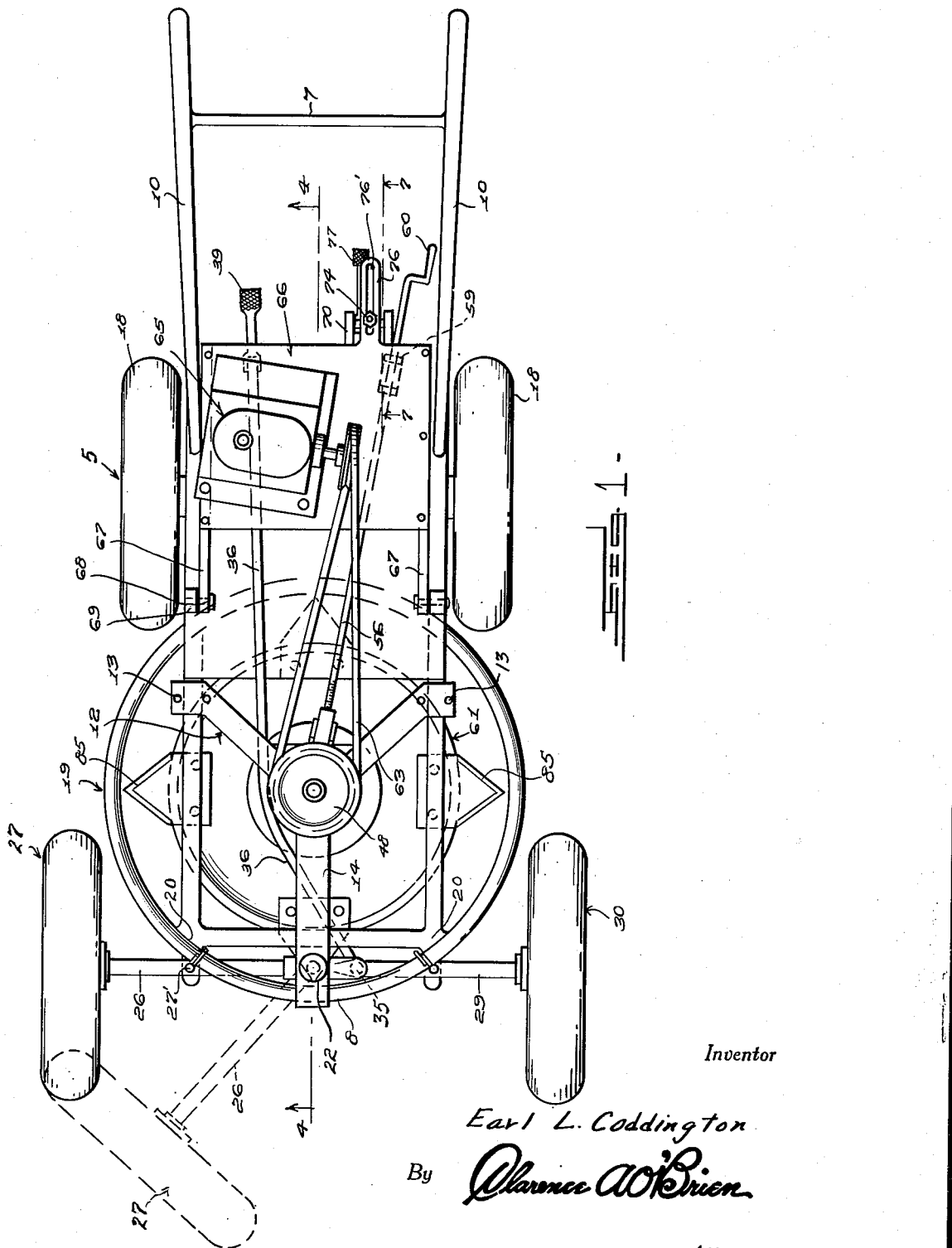
Inventor
Earl L. Coddington
By Clarence A. O'Brien
Attorneys Sept. 14, 1943.     E. L. CODDINGTON     2,329,185
MACHINE FOR CUTTING GRASS, WEEDS, AND THE LIKE
Filed July 30, 1940     6 Sheets-Sheet 2
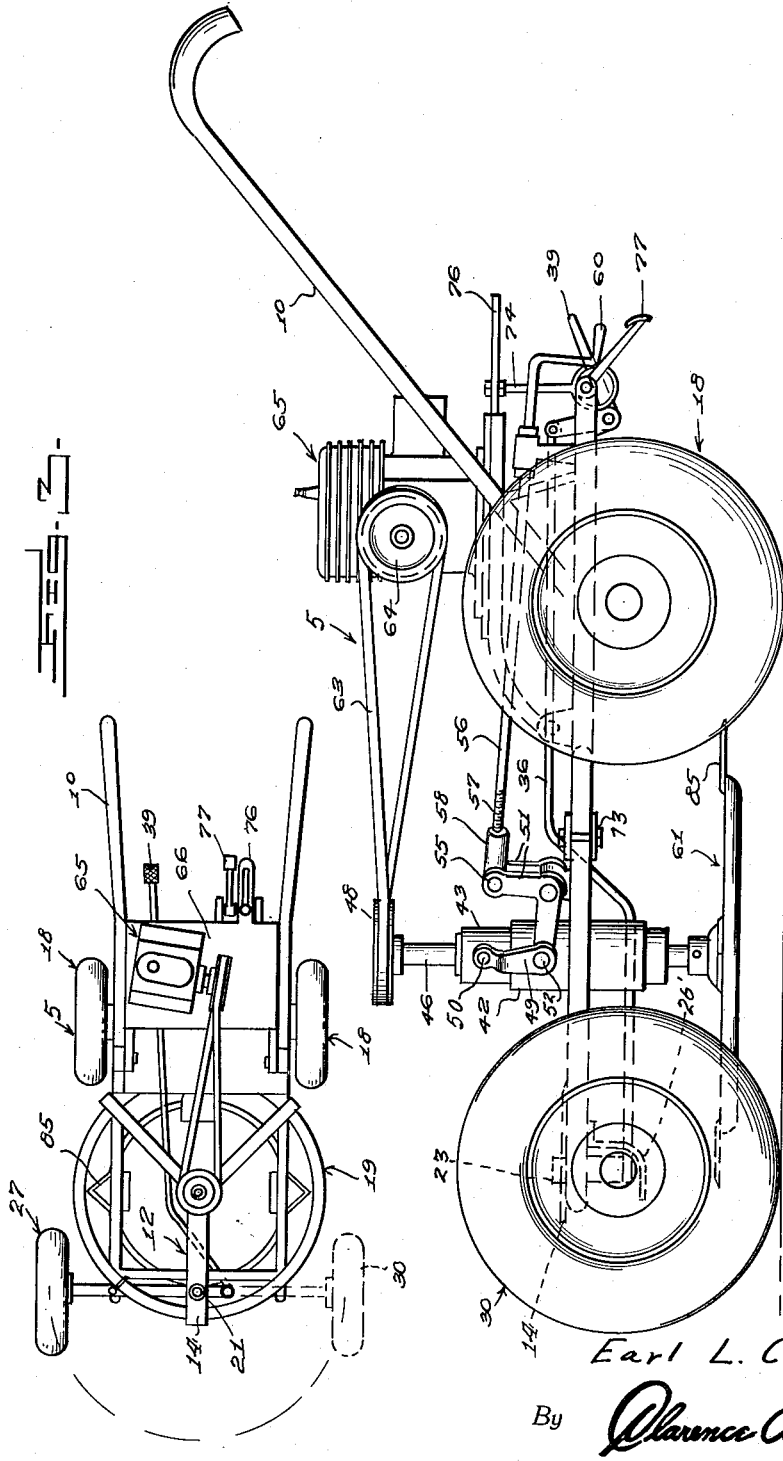
Inventor
Earl L. Coddington
By Clarence A. O'Brien
Attorneys

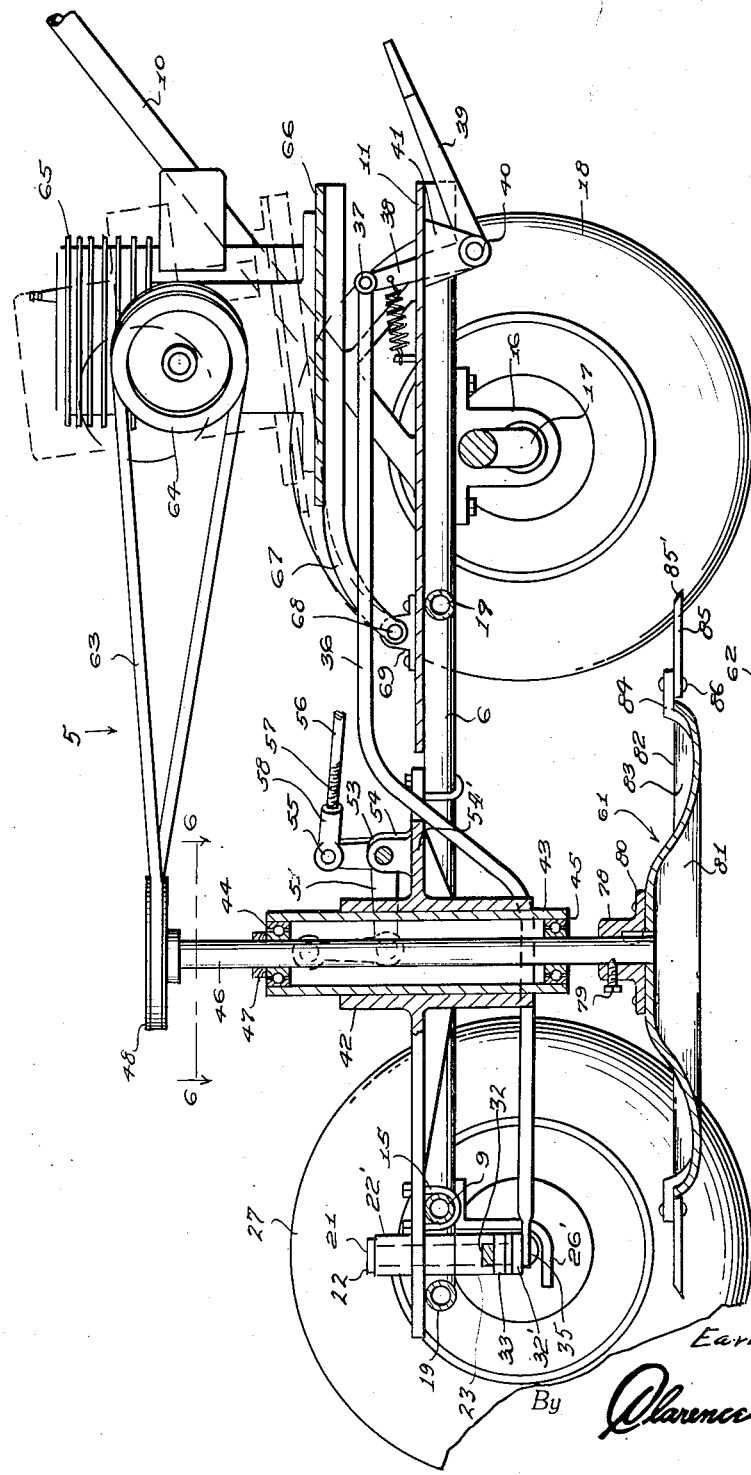

Sept. 14, 1943.   E. L. CODDINGTON   2,329,185
MACHINE FOR CUTTING GRASS, WEEDS, AND THE LIKE
Filed July 30, 1940   6 Sheets-Sheet 4
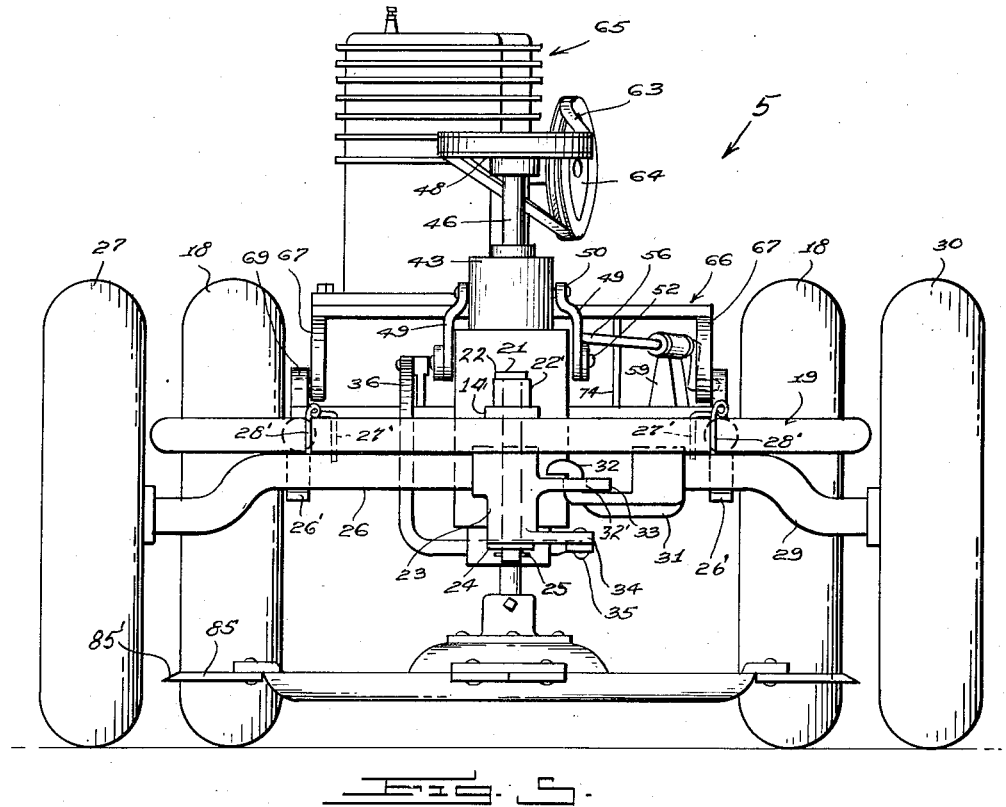
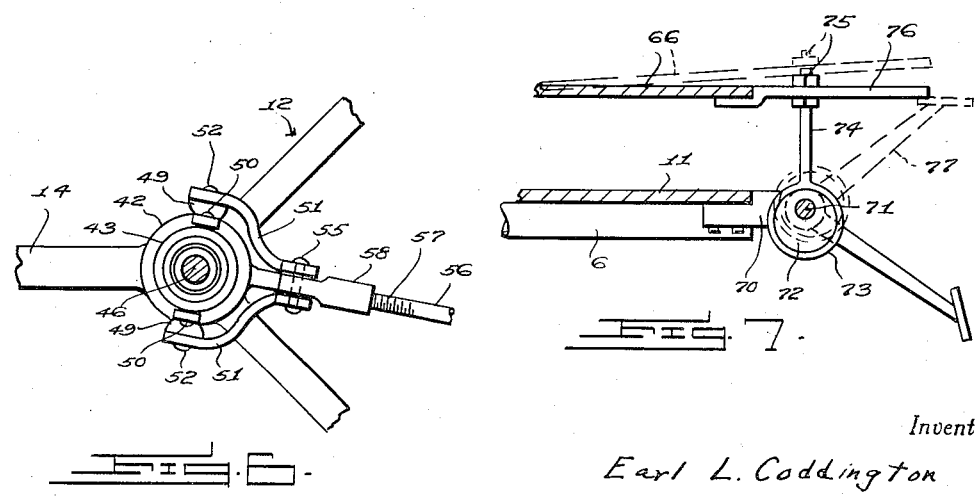
Inventor
Earl L. Coddington
By Clarence A. O'Brien
Attorneys

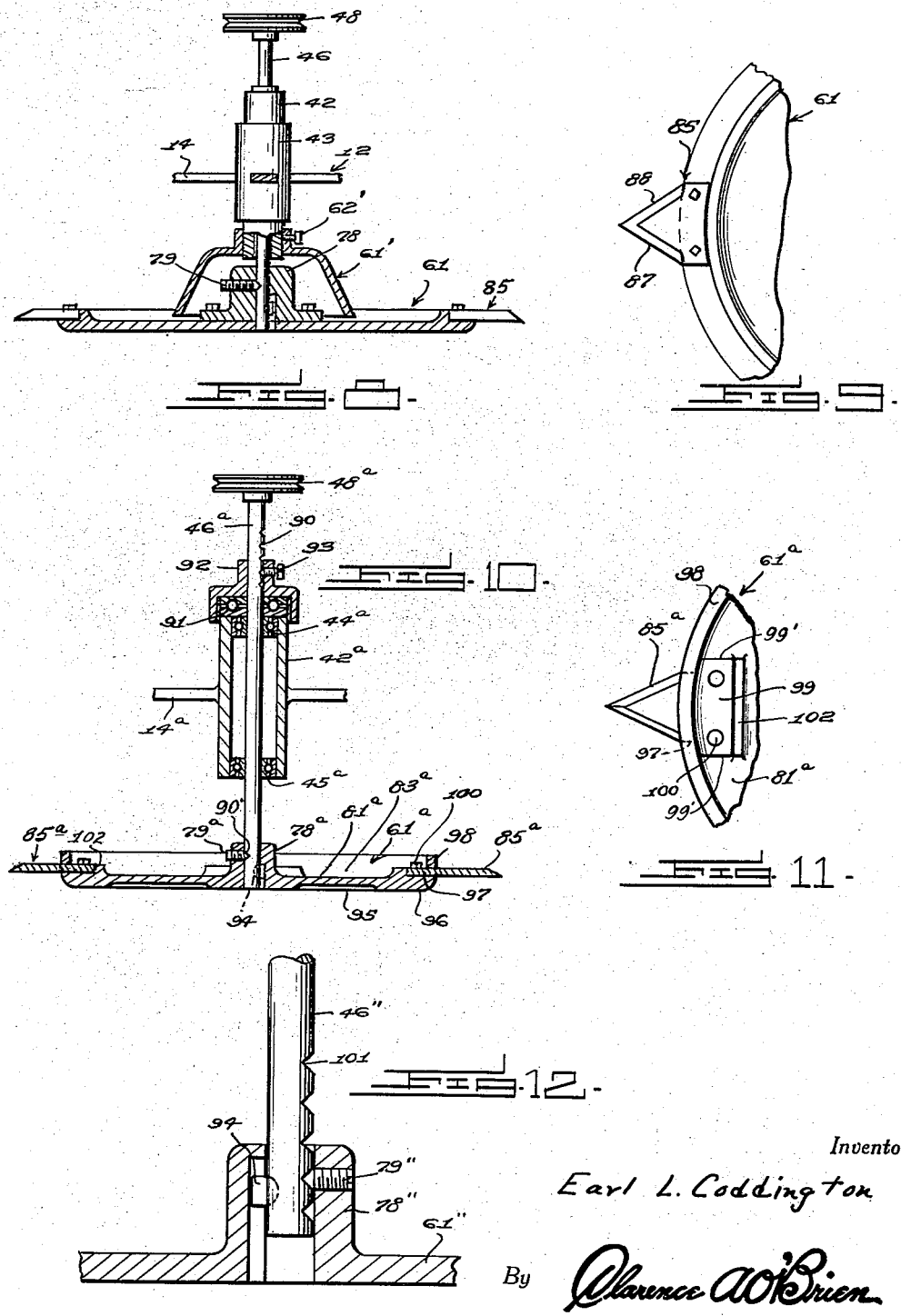

Sept. 14, 1943.   E. L. CODDINGTON   2,329,185
MACHINE FOR CUTTING GRASS, WEEDS, AND THE LIKE
Filed July 30, 1940   6 Sheets-Sheet 6
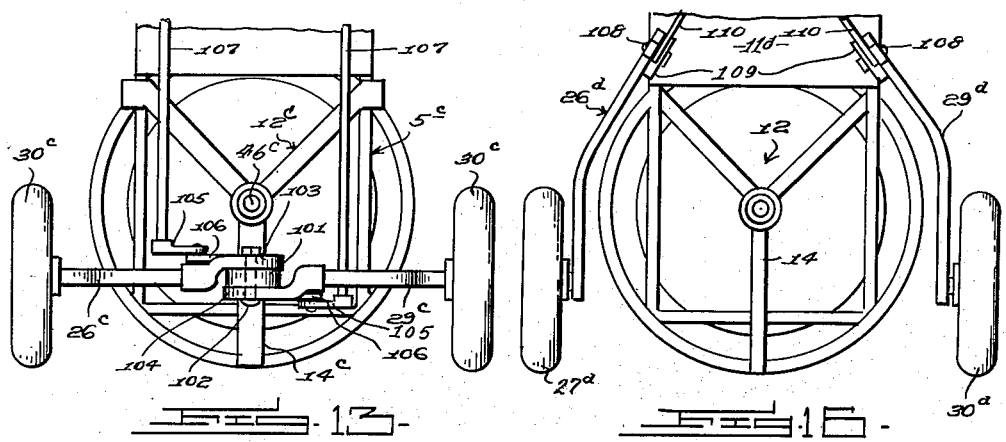
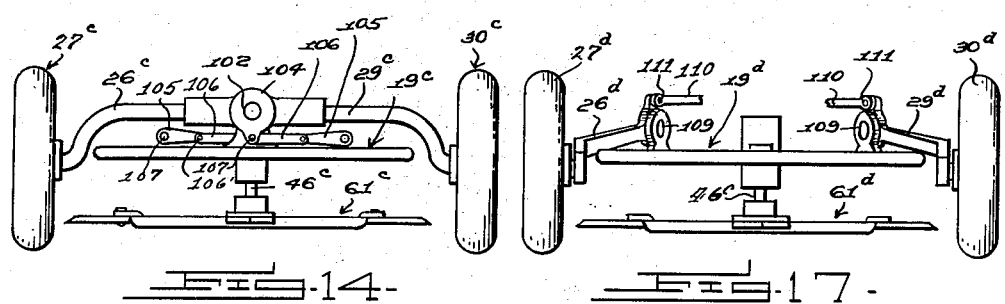
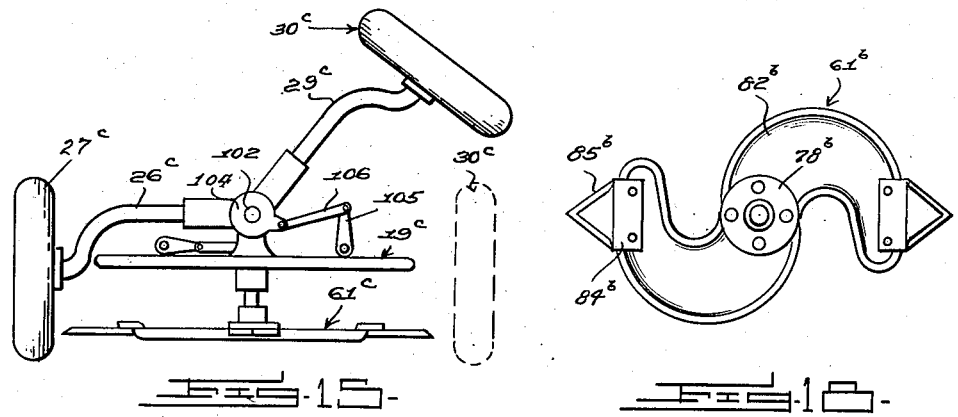
Inventor
Earl L. Coddington
By   Clarence A. O'Brien
Attorney Patented Sept. 14, 1943

2,329,185

UNITED STATES PATENT OFFICE 2,329,185

MACHINE FOR CUTTING GRASS, WEEDS, AND THE LIKE

Earl L. Coddington, Middletown, Ohio

Application July 30, 1940, Serial No. 349,031

7 Claims. (Cl. 56—25.4)

My invention relates to improvements in machines for cutting grass, weeds, and the like, and among the important objects of my invention are to provide improved structure and arrangement of parts whereby the machine operates efficiently not only on level and smooth ground, but also on rough terrain without digging into the ground or into the roots of grass or the like being cut, or crushing down the grass or the like in advance of the cutter of the machine, means to cause the grass or the like to be initially engaged in such a manner as to fall forward away from the machine and into a better position for cutting by the machine so as to avoid any entanglement with the machine being provided as well as means enabling raising or lowering the cutter while the motor is running and without performing mechanical adjustments upon the machine, to determine the length to which the grass or the like is to be cut.

Another important object of the invention is to provide means to positively prevent winding of the cut grass or the like around the cutter or any rotary element of the machine.

Another important object of the invention is to provide a machine of the character described which is readily convertible from a three-wheel to a four-wheel type of machine, and vice versa, to better accommodate the machine to the work at hand and the type of ground, and which embodies arrangements whereby the operator of the machine has a full view at all times of the entire field of cut of the cutter.

Other important objects and advantages of my invention will be apparent from a reading of the following description taken in connection with the drawings, wherein for purposes of illustration I have shown preferred embodiments of my invention.

In the drawings—

Figure 1 is a general top plan view of the preferred embodiment of the invention showing one of the front wheels thereof in dotted lines in an adjusted position.

Figure 2 is a general side elevational view of Figure 1.

Figure 3 is a view similar to Figure 1 on a reduced scale but showing the machine converted from a four-wheel to a three-wheel machine.

Figure 4 is an enlarged fragmentary longitudinal vertical sectional view taken through Figure 1 approximately on the line 4—4 and looking upwardly in the direction of the arrows.

Figure 5 is a front end elevational view looking from left to right in Figure 1.

Figure 6 is a horizontal sectional view taken through Figure 4 approximately on the line 6—6 and looking downwardly in the direction of the arrows.

Figure 7 is a fragmentary longitudinal vertical sectional view taken through Figure 1 approximately on the line 7—7 and looking upwardly in the direction of the arrows.

Figure 8 is a sectional elevational view taken through the cutter mounting and cutter.

Figure 9 is an enlarged fragmentary top plan view of the cutter of Figure 8.

Figure 10 is a transverse vertical sectional view taken through another form of cutter support and cutter.

Figure 11 is a fragmentary top plan view of a portion of the cutter of Figure 10.

Figure 12 is a transverse vertical sectional view taken through a portion of a cutter and showing a modified form of cutter shaft and the connection of the cutter therewith for vertical adjustment.

Figure 13 is a fragmentary top plan view of a modified form of two-wheel front suspension.

Figure 14 is a front end elevational view of Figure 13.

Figure 15 is a view similar to Figure 14 but showing one of the wheels adjusted in an out-of-the-way position.

Figure 16 is a fragmentary top plan view of another form of front suspension.

Figure 17 is a front end elevational view of Figure 16.

Figure 18 is a top plan view of a modified form of cutter.

Referring in detail to the drawings and first to Figures 1 through 8 thereof, the numeral 5 generally designates the chassis frame which may suitably consist of a pair of laterally spaced pipes 6 which are spaced and connected by a forward cross member 9, with upwardly and rearwardly inclined handles 10. A base or plate 11 is fastened to the tops of the side members 6 across the rear of the frame and a Y-shaped member 12 extends across the front of the frame and has the terminals of its legs clamped as indicated by the numeral 13 to the respective side members 6 and its standard portion 14 clamped by means of a U-bolt 15 to the front cross member 9. Axle bearings 16 fixedly depend from the rear part of the side members 6 and outwardly of these bearings the axle 17 traversing these bearings has the ground engaging wheels 18 attached thereto, the wheels preferably being equipped with pneumatic tires.

A tubular ring 19 is rigidly connected by welding, not shown, to forward portions 20 of the side members of the frame with the main part of the ring extending rearwardly to a position immediately forward of the wheels 18. It is to be noted that the lateral spacing of the wheels 18 is less than the diameter of the ring 19 so that the wheels 18 will travel within the swath or cut which is subtended by the inside diameter of the ring 19 which is of substantially the same diameter as that of the cutter to be described.

The standard portion 14 of the Y-shaped member 12 has a tubular bearing 22' traversed by a kingpin bolt 21 including the head 22 on its upper end which bears upon the top of the tubular bearing. The bolt 21 depends below the frame 5 to pass through a knuckle 23, the bolt having a washer 24 held in place by a cotter key or the like 25 against the lower end of the knuckle 23, the said knuckle bearing turnably against the underside of the portion 14 of the Y-shaped member 12. From one side of the knuckle 23 extends a half axle 26 which has a pneumatic tired wheel 27 on its outer end and laterally outwardly spaced from the rear wheel 18 on the corresponding side of the frame. Tensioned spring retainers straddling the front part of the ring 19 have depending legs 27' and 28' which engage fore and aft portions of the axle 26 to keep the same in proper transverse alignment and to enable easy release of the axle for such position to assume one of the adjusted positions. Depending J-shaped stops 26' limit the rearward swing of the half axles. A similar means of retaining another half axle 29 is provided, this axle having a wheel 30 similarly arranged with respect to the wheel 27, and positioned laterally outwardly from the corresponding rear wheel 18. The laterally inward end of the axle 29 has a fitting 31 equipped with an upwardly and laterally directed nose 32 arranged to hook through and over an opening 32' formed in a lug 33 projecting laterally from the knuckle 23, whereby the axles 26 and 29 are coupled together to prevent relative longitudinal shifting thereof. The knuckle 23 has another lug 34 spaced below the lug 33 and the extremity of this lug has the pivotal connection 35 with the forward end of the adjustment rod 36 which is suitably laterally upwardly deflected to have a rear portion extending above and along the right hand side of the chassis 5 and pivotally connected at 37 at its rear end to the upper end of the arm 38 on the foot lever 39 which is pivoted as indicated by the numeral 40 on a bracket 41 on the under part of the plate 11 as shown in Figure 4. By depressing the free end of the lever 39 with the foot, the left hand axle and wheel assembly 29, 30 having been removed, the operator can cause the right hand wheel 27 to swing toward the left side of the machine as indicated in Figure 1 in dotted lines.

Supported at the junction of the legs and the standard portion 14 of the Y-shaped member 12 is a vertical tube 42 in which is vertically slidably mounted the rotor support 43 which is in the form of a tube having upper and lower bearing assemblies 44 and 45, respectively, in which the cutter shaft 46 turns, a stop collar 47 on the upper part of the cutter shaft bearing on the upper bearing assembly 44, and a pulley 48 on the upper end of the shaft providing for a drive connection thereto. Links 49 pivoted at their upper ends as indicated by the numeral 50 to opposite sides of the support 43 have their lower ends pivoted to the free end of one arm of the bellcranks 51 as indicated by the numerals 52, the said bellcranks being pivoted at their elbows as indicated by the numeral 53 on ears 54 rising from a portion 54' located between the legs of the Y-shaped member, the free ends of the remaining arms of the bellcranks being provided as indicated by the numeral 55 with a socket 58 in which the threaded front end 57 of an operating rod 56 is threaded. The rear part of the said rod is fixed to rotate in a bracket 59 on the top of the base plate 11, as shown in Figure 5, in such a way that longitudinal movement of the rod 56 is prevented during its rotation by the crank handle 60 which extends rearwardly from the base 11 close to one of the handles 10. By rotating the handle 60 in one direction, the rod 56 will cause the socket 58 to move longitudinally and tilt the upper arms of the bellcranks 51 rearwardly and thereby elevate the rotor shaft support 43 and consequently elevate the cutter which is generally designated 61, with respect to the ground 62. Rotation of the handle 60 in the opposite direction will in a similar manner effect depression of the cutter to a position closer to the ground 62, the entire operation being effected by the operator without leaving his position at the handles 10 and without entailing any mechanical rearrangements or adjustments.

The pulley 48 on the upper end of the cutter shaft 46 has trained thereover a belt 63 which is trained over the flywheel pulley 64 on a suitable internal combustion engine 65 which is mounted on an adjustable base 66 which overlies spacedly the base 11 and is supported by longitudinally disposed brackets 67 which are pivoted at their front and depressed ends as indicated by the numeral 68 on brackets 69 mounted on the base 11, so that the weight of the engine and the base 66 will be supported by the belt 63 which will thereby have a strong traction on the pulley 48 for driving the cutter.

Means for adjusting the angulation of the engine base 66 is shown in Figure 7 and comprises a bracket 70, extending rearwardly from the plate 11, in which is journaled a shaft 71 on which is fixed an eccentric 72 on which is rotatably mounted an eccentric ring 73 fixed on the lower end of a rod 74 which is fastened as indicated by the numeral 75 to an extension 76 fastened to the rear edge portion of the engine base 66. The shaft 71 has an operating foot lever 77 thereon for rotating the eccentric 72 to operate the rod 74 to cause elevation or depression of the motor base 66 to loosen or tighten the drive belt 63 as desired.

The cutter which is embodied in Figures 1, 2, 3, 4, 5 and is generally designated 61 comprises a hub 78 to surround the lower end of the shaft 46 equipped with a set screw 79 to lock the hub on the shaft, the hub having a flange 80 which is riveted or otherwise suitably secured to the upwardly convexed central portion 81 of the disk 82. This disk has the concaved annular outer portion 83 terminating in the upturned edge over which lie at equally circumferentially spaced intervals, the blade attaching lugs 84 to the underside of which the triangular blades 85 are attached by means of bolts 86. The blades each presenting two relatively angulated cutting edges 87 and 88, the edges being downwardly beveled as indicated at 85' in Figure 4 and also in Figure 5.

In an alternate form of mounting for the cutter shown in Figure 10, together with a modified form of cutter, the stationary tubular portion 42a carries upper and lower bearing assemblies 44a and 45a in which the cutter shaft 46a turns. In this form instead of having a stop collar 47 the shaft has a series of vertically spaced notches 90 with which a set screw 93 on a cap 92 engages, with the said cap resting on an additional bearing assembly 91 resting on the upper end of the tube 42a. The notches 90 permitting vertical adjustment of the shaft 46a without having an adjusting lever system as disclosed in connection with the first described embodiment. In the present instance, the cutter which is generally designated 61a has an integral hub 78a with a set screw 79a to engage a notch 90' in the lower end of the rotor shaft in conjunction with a key 94 engaging a slot in the shaft. The lower end of the hub merges into a flat circular plate 81a which is concaved as indicated by the numeral 83a on its upper side as well as having an annular concavity 95 in its underside, the two concavities defining an annular rim 96 which has circumferentially spaced holes or slots 97 in the elevated portion 98. The holes 97 are arranged to receive the blades 85a with the butt portions 99 of the blades being widened at 99' to engage the inner side of the raised portion 98 at opposite sides of the slots 97, all the blades being held in place by fastening bolts 100 traversing the butt portions of the blades and threading into the rim 96, with the inner end or heel of the blade engaging an abutment 102.

In the case of each form of cutter described the bottom of the rim of the cutter is rounded as shown to cause the cutter to slide over the ground when brought into contact with the ground so that the blades will be held above the ground and prevented from digging into the roots of the grass or the like during the operating of the cutter. The upset central index portion of the disk is so formed to reduce friction drag on the cutter by reducing the amount of cutter surface in contact with the ground.

A variation in the manner of connecting the cutter on the cutter shaft from that of the embodiment shown in Figure 10 is shown in Figure 12, wherein the lower end of the cutter shaft is characterized by a vertical series of notches 101 to be selectively engaged by the said screw 79'' in the hub 78'', to be used instead of the notches 90 in the upper part of the shaft in the form shown in Figure 10 for achieving the desired vertical adjustment of the cutter 61'' with respect to the ground.

A modified form of cutter is shown in Figure 18 and generally designated by the numeral 61b. This is characterized by an S-shaped concavo-convex plate 82b which has a hub 78b at its center and has the brackets 84b overhanging the upper edge of the plate at the laterally outward side of the terminal portions of the plate to hold the triangular-shaped blades 85b in substantially diametrically aligned and oppositely pointing position.

Referring now to Figures 13, 14 and 15, showing a modified form of front wheel suspension, the numeral 5c generally designates the chassis frame having the Y-shaped member 12c thereon and supporting in a manner already described the cutter shaft 46c and a cutter 61c below the ring 19c. In the present form of the invention a bracket 101 rises from the standard portion 14c of the Y-shaped member, the bracket carrying a longitudinally arranged bolt 102 which traverses plates 103 and 104 on opposite sides of the bracket 101, these plates being attached to corresponding half axles 26c and 29c carrying the right and left hand front pneumatic tired front wheel 30c and 27c, respectively. Suitably mounted on the chassis 5c and along opposite sides thereof are rotatable rods 107 which have levers 105 fixed at their front ends which are pivotally connected at 106' at their outer ends to one end of links 106 which have their laterally inward ends pivotally at 107' connected to eccentric portions of the plates 103 and 104 so that upon rotation of either one of the rods 107, the half axle and wheel corresponding thereto on that side of the chassis will be elevated toward the position illustrated in Figure 15 or brought down to ground engaging position shown in Figure 14. The toggle action of the links 106 and lever 105 is so arranged that the wheels are locked in either the extreme elevated or the extreme depressed position. This adjustability of the wheels which are sufficiently spaced apart to be outside of the path of the grass or the like to be cut by the rotor cutter, enables either wheel to be elevated to an out-of-the-way position while the other engages the grass to be cut in front of the machine but at one side of the path of the cutter.

In a further modified form of front suspension shown in Figures 16 and 17, rearwardly and laterally inwardly disposed half axles 26d and 29d are provided with the wheels 27d and 30d, respectively, the rear ends of the half axles being mounted on pivots 108 on brackets 109 mounted on the base 11d. Connecting rods 110 are pivotally connected at their forward ends as indicated by the numerals 111 to eccentric portions of the rear ends of these half axles as shown in Figure 17, so that upon rearward and forward adjustment of the rod 110 either one or both of the wheels may be elevated out of ground engaging position and held therein.

Although I have shown and described herein preferred embodiments of my invention, it is to be definitely understood that I do not desire to limit the application to the precise structure and arrangement of parts shown and described, except as may be required by the scope of the subjoined claims.

Having described the invention, what is claimed as new is:

1. In a machine for cutting grass and the like, of the type comprising a vertical axis rotary cutter, said rotary cutter comprising a shaft and a rotor fixed on the lower end of said shaft, said rotor comprising a substantially S-shaped plate having a raised rim, and radially projecting blades mounted to project from said rim from the opposite ends of said S-shaped plate.

2. In a machine for cutting grass and the like, a chassis, a vertical axis rotary cutter mounted on said chassis, said rotary cutter comprising a vertical shaft having a cutter rotor on its lower end, a housing mounted on said chassis, and support means supporting said shaft from said housing for rotation relative thereto, said support means comprising bearings on said housing journaling said shaft, stop means fixed on said shaft and rotatably resting on said bearings, and adjustable detent means on said stop means permitting vertical adjustment of said shaft relative to said support means.

3. In a machine for cutting grass and the like, a chassis, a vertical axis rotary cutter mounted on said chassis, said rotary cutter comprising a shaft and a rotor fixed on the lower end of said shaft, said rotor having circumferentially spaced radially extending blades, said rotor comprising a substantially circular disk, said disk having a raised rim on which said blades are mounted, the bottom of said disk adjacent said rim being downwardly convexed to slide freely in contact with the ground and keep said blades from digging into the ground, the central portion of said disk being elevated with respect to the ground to reduce the area of the bottom of the disk in contact with the ground.

4. In a machine for cutting grass and the like, a chassis, a vertical axis rotary cutter mounted on said chassis, said rotary cutter comprising a shaft and a rotor fixed on the lower end of said shaft, said rotor having circumferentially spaced radially extending blades, said rotor comprising a substantially S-shaped plate having a raised rim on which said blades are mounted, the bottom of said S-shaped plate adjacent said rim being downwardly convexed to slide freely in contact with the ground and keep said blades sufficiently elevated to prevent said blades from digging into the ground.

5. In a vertical axis high speed cutter rotor for a grass cutting machine, a disk rounded on the underside of its peripheral edge for planing said disk over the ground as the machine is moved along, a raised annular rim on said peripheral edge, said annular rim being formed with circumferentially spaced radial openings, with a raised abutment on the upper surface of the disk in radial alignment with and radially spaced inwardly from each such radial opening, a blade having a substantially triangular cutting part passing through each radial opening and extending radially outwardly from said peripheral edge, each blade having a base wider than the cutting part, said base being positioned in engagement between the inner side of the raised annular rim and the corresponding abutment, and at least one fastening bolt traversing said base and threaded into the underlying portion of said disk.

6. In a vertical axis high speed cutter rotor for a grass cutting machine, a disk rounded on the underside of its peripheral edge for planing said disk over the ground as the machine is moved along, a raised annular rim on said peripheral edge, said annular rim being formed with circumferentially spaced radial openings, with a raised abutment on the upper surface of the disk in radial alignment with and radially spaced inwardly from each such radial opening, a blade having a substantially triangular cutting part passing through each radial opening and extending radially outwardly from said peripheral edge, each blade having a base wider than the cutting part, said base being positioned in engagement between the inner side of the raised annular rim and the corresponding abutment, and at least one fastening bolt traversing said base and threaded into the underlying portion of said disk, said radial opening being located on a level above the bottom of said disk.

7. A cutter assembly for a grass cutting machine of the type involving a chassis together with a vertical axis rotary cutter assembly; said cutter assembly comprising a vertical slideway on said chassis, a bearing tube vertically slidable in said slideway, said bearing tube comprising upper and lower bearings, the cutter of the assembly having a vertical shaft rotatably carried by said bearings, lever means fulcrumed on said chassis and operatively connected to said bearing tube for raising and lowering said bearing tube and the shaft of the cutter, and combined operating and position holding means connected to said lever means.

EARL L. CODDINGTON.